Patented Dec. 25, 1928.

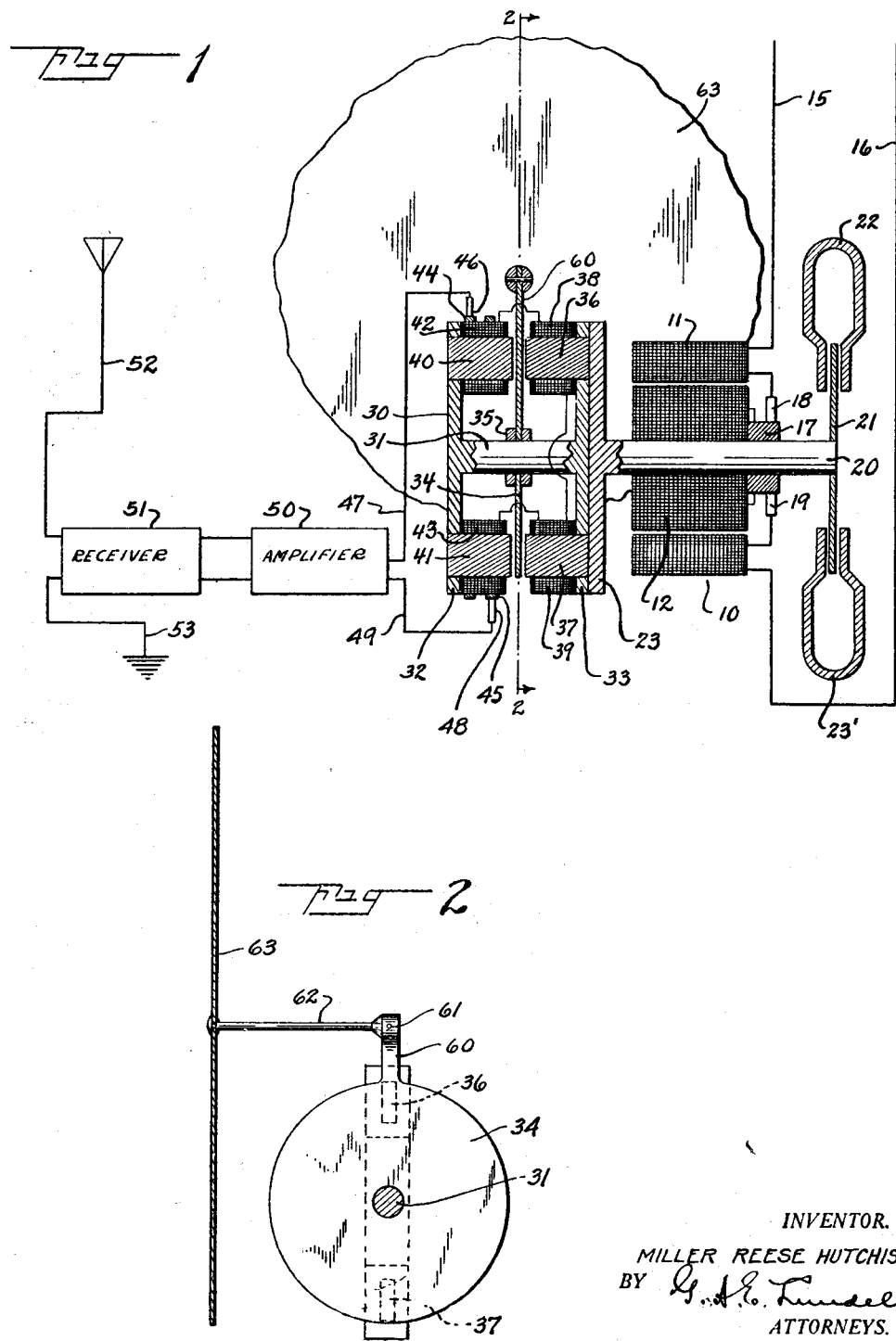

1,696,303

UNITED STATES PATENT OFFICE.

MILLER REESE HUTCHISON, OF LLEWELYN PARK, WEST ORANGE, NEW JERSEY, ASSIGNOR, BY MESNE ASSIGNMENTS, TO ACOUSTIC PRODUCTS COMPANY, OF NEW YORK, N. Y., A CORPORATION OF DELAWARE.

METHOD OF SOUND PROPAGATION.

Application filed March 9, 1927. Serial No. 173,857.

This invention relates to improvements in sound propagation and more particularly to the utilization of a power driven mechanism for producing compressional waves.

The invention has as its principal object, the provision of a sounding device for propagating compressional waves energized from an external source of power and controlled by an undulatory current of audio frequency.

A feature of the invention relates to the provision of a prime mover such as an electric motor for rotating a disc in combination with a diaphragm or sounding medium to be vibrated in combination with means for impressing upon the source of power an adjustable load in accordance with energy of sound frequency.

Another feature relates to the utilization of a magnetic field to retard the movement of a rotatable element, and for controlling the intensity of field in accordance with oscillatory energy of sound frequency.

Other objects will appear from the following description taken in connection with the accompanying drawing in which Figure 1 shows a loud speaker partly in section embodying features of the invention.

Figure 2 is a diagrammatic view of the operating element of Figure 1.

Like reference characters denote like parts in the several figures of the drawing.

In the following description and claims, parts, characteristic features, and functions will be identified by specific names for convenience of expression but they are intended to be as generic in their application to similar parts or functions or equivalent construction as the state of art permits.

Referring to the drawing there is shown a source of power such as a constant speed direct current electric motor 10 comprising a stationary field 11 and a rotatable armature 12. The field 11 of the motor includes a plurality of field coils, which are connected in series with each other and across power mains 15, 16, extending from a suitable source of direct current such as a generator (not shown). In the embodiment illustrated, the armature 12 of the motor 10, is provided with a commutator 17 having a pair of brushes 18, 19, connected in series with the field magnets. Thus in the form shown the motor 10 is a series wound motor. The armature 12 is positioned on a motor shaft 20 mounted in suitable bearings and having at one end a disc 21 secured thereto. The disc 21 is formed of an electrically conducting material which is inert magnetically, such as aluminum or the like. The periphery of the disc 17 extends in between spaced poles of a plurality of stationary magnets 22, 23', shown two in number and in the form of permanent magnets, it being understood that any desired number of such magnets may be employed and that the magnets may take the form of an electromagnet, without departing from the spirit of the invention.

At its other end the shaft 20 is provided with a non-magnetic flange 23. Secured to the outer face of the flange 23 there is provided a permanent magnet 30 comprising a hub portion 31 and two end flanges 32, 33. Loosely mounted on the hub portion 31 of the magnet 30 there is provided a thin circular disc 34 formed of magnetic inert material, such as aluminum or an alloy of aluminum, or the like. The disc 34 is positioned intermediate the flanges 32, 33 of the magnets 30, and is maintained in fixed longitudinal position by a pair of split, non-friction collars 35, 35 affixed to the hub 31. Secured to the outer face of the flange 23 and extending into close proximity to the contiguous surface of the disc 34 is a plurality of magnet cores, shown two in number as at 36, 37 the arrangement being such that the cores 36, 37 are in intimate magnetic contact with the associated flange 32 of the magnet 30. The cores 36, 37 are preferably of laminated construction. A magnet coil or solenoid 38 is provided on the upper core 36 and a similar coil 39 is provided on the lower core 37. A similar number of magnet cores, as at 40, 41 is provided in position to the cores 36, 37, in this instance being secured to the flange 33 of the magnet 30 so as to maintain an intimate magnetic contact with the magnet 30. A magnet coil or solenoid 42 is provided on one core 40 and a similar magnet coil 43 is provided on the other core 41 as shown. The coils 38, 39, 42 and 43 are connected electrically in series, and to a pair of collecting rings 44, 45. One ring 44 is engaged by a brush 46 which is connected to a conductor 47. Similarly the ring 45 is engaged by a brush 48 which is connected to a conductor 49.

The conductors 47, 49 extend from the output of an amplifier 50 which is controlled by a radio receiving device 51 energized by energy impressed upon a radio energy collecting device such as an antenna 52 and ground 53 in a conventional manner. It is understood that any desired number of solenoids, such as 38, 39, 42 and 43 may be provided to produce the magnetic field which acts on the disc 34, and that their windings may be connected in series-multiple or any other desired manner.

Referring to Fig. 2 the disc 34 is provided with an outwardly extending lug 60 pivotally secured as by a connection to the central portion of a diaphragm or sounding medium 63. The diaphragm 63 may be supported in any well known manner to permit free vibration of its middle portion for producing compressional waves in the surrounding atmospheric medium, and there may be associated therewith a suitable horn or other sound directing device as may be desired.

In operation current flows from the pole of the generator connected to the conductor 15, and by way of this conductor to one terminal of the field winding, one field winding, armature brush 18, commutator 17, armature 12, armature brush 19 the other field winding to the conductor 16, and thus to the opposite pole of the generator. The motor 10 is thus energized to rotate the shaft and its associated parts at a predetermined rate of speed in a clock-wise direction as seen in Figure 2. The motor shaft 20 carries with it the disc 21 the peripheral portion of which cuts the lines of force of the magnetic field produced by the magnets 22, 23. Rotation of the disc is thus effectively retarded and accordingly the motor shaft 20 operates at a relatively slow rate.

The motor shaft 20 carries with it, the electromagnets 36, 39, 42 and 43 and also causes the permanent magnetic field produced by the permanent magnet 30 to rotate with respect to the disc 34. Due to the lines of force of this magnetic field cutting the disc 34 a torque is exerted upon the disc 34. With no current or steady current flowing through the circuit of the electromagnets 38, 39, 42, 43 this torque exerts a constant pull on the link 62 and on the diaphragm 63.

Assuming now that radiant energy modulated in accordance with a signal such as a broadcast signal, is being received on the energy collecting device 52, the receiver 51 is adjusted to produce in its output circuit an undulatory current of audio frequency corresponding to the signal. This current is impressed upon the input of the amplifier 50 and in amplified form current modulated in accordance with the signal flows over the conductor 47, brush 46, collecting ring 44, winding of magnets 42, 38, 39 and 43 in series, collecting ring 45, brush 48, conductor 49, to the return wire of the amplifier 50. Thus it will be seen that the permanent magnetic field produced by the permanent magnet 30 is modified in accordance with the signal, and thus the torque exerted on the disc 34 is modified accordingly. This causes a variation in the pull on the link 62 and a movement of the middle of the diaphragm 63. Thus the diaphragm 63 is actuated by the source of power comprising the electric motor 10 in accordance with currents of audio frequency supplied over conductors 47, 49. The diaphragm 63 is thus actuated to produce extremely large volumes of sound.

The invention upon which this application is based is broader than the specific embodiment shown and described for the purpose of illustrating at least one of the ways in which it may be employed. The scope of the invention is, therefore, to be understood as not being limited by the present specific description. I intend no limitations other than those imposed by the claims.

What I claim is:

1. In a loud speaker, a rotatable shaft, means for rotating said shaft at a predetermined rate of speed, means positioned on said shaft for producing a rotating magnetic field of force, a disc loosely mounted on said shaft and having its periphery positioned within the range of said magnetic field, a diaphragm operatively connected to said disc, and means for varying the intensity of said magnetic field in accordance with a signal current having a component of audio frequency.

2. In a loud speaker, a source of power comprising a constant speed electrical motor having a stationary field and a rotatable armature, a rotatable shaft for said armature, a disc formed of aluminum driven by said shaft, a plurality of stationary magnets for producing a magnetic field intercepting the periphery of said disc to retard rotation thereof, a second aluminum disc loosely mounted on said shaft, means for positioning said disc in fixed longitudinal position with respect to said shaft, a magnet affixed to said shaft and rotatable therewith for producing a magnet field of force intercepting the periphery of said disc for exerting a torque on said disc during rotation of said shaft, means to modify the action of said magnetic field with respect to said disc, in accordance with a signal, and a diaphragm controlled by said disc for producing compressional waves in a surrounding natural medium.

3. In a loud speaker, a source of power comprising a constant speed electrical motor having a stationary field and a rotatable armature, said armature including a rotatable shaft, a disc formed of magnetically inert material driven by said shaft, a plurality of stationary magnets for producing a magnetic field intercepting the periphery of said disc to retard rotation thereof, a second magnetically inert disc loosely mounted on said shaft, means for positioning said disc in fixed longitudinal position with respect to said shaft, a magnet affixed to said shaft and rotatable therewith for producing a magnetic field of force intercepting the periphery of said disc for exerting a torque on said disc during rotation of said shaft, means to modify the action of said magnetic field with respect to said disc in accordance with the signal, and a diaphragm controlled by said disc for producing compressional waves in a surrounding natural medium.

4. In a loud speaker, a shaft, means for rotating said shaft, a disc formed of aluminum driven by said shaft, a plurality of stationary magnets for producing a magnetic field intercepting the periphery of said disc to retard rotation thereof, a second aluminum disc freely mounted on said shaft, a pair of collars affixed to said shaft for positioning said disc in fixed longitudinal position with respect to said shaft, a magnet affixed to said shaft and rotatable therewith for producing a magnetic field of force intercepting the periphery of said disc for exerting a torque on said disc during rotation of said shaft, means to modify the action of said magnetic field with respect to said disc in accordance with a signal, and a diaphragm controlled by said disc for producing compressional waves in a surrounding natural medium.

5. In a loud speaker, a driven shaft, an element secured thereto, a plurality of stationary magnets for producing a magnetic field intercepting a portion of said element to retard rotation thereof, a second element freely mounted on said shaft, a magnet affixed to said shaft and rotatable therewith for producing a magnetic field of force intercepting a portion of said element for exerting a torque on said last named element during rotation of said shaft, means to modify the action of said last named magnetic field with respect to said disc in accordance with a signal, and a diaphragm controlled by said last named element for producing compressional waves in a surrounding natural medium.

6. In a loud speaker, a speed prime mover, a rotatable shaft driven thereby, a plate formed of aluminum driven by said shaft, a plurality of stationary magnets for producing a magnetic field intercepting the periphery of said plate to retard rotation of the shaft, a second aluminum plate rotatably mounted on said shaft, a magnet affixed to said shaft and rotatable therewith for producing a magnetic field of force intercepting the periphery of said last named plate for exerting a torque of said disc during rotation of said shaft, means to modify the action of said last named magnetic field with respect to said disc in accordance with the signal, and a diaphragm controlled by said disc for producing compressional waves in a surrounding natural medium.

7. In a loud speaker, a constant speed prime mover, a rotatable shaft driven thereby, a magnetically inert disc rotatably mounted on said shaft, means for positioning said disc in fixed longitudinal position with respect to said shaft, a magnet affixed to said shaft and rotatable therewith for producing a magnetic field of force intercepting the periphery of said disc for exerting a torque of said disc during rotation of said shaft, an electric circuit arranged to modify the action of said magnetic field with respect to said disc in accordance with a signal, and a diaphragm controlled by said disc for producing compressional waves in a surrounding natural medium.

8. In a loud speaker, a rotatable shaft, means for rotating said shaft, an electromagnet is positioned on said shaft for producing a rotating magnetic field of force, a non-magnetic element loosely mounted on said shaft and having its periphery positioned within the range of said magnetic field, a diaphragm operatively connected to said element, and means for varying the intensity of said magnetic field in accordance with a signal current having a component of audio frequency.

Signed at New York in the county of New York and State of New York this 7th day of March, A. D. 1927.

MILLER REESE HUTCHISON.